(12) United States Patent
Meyer

(10) Patent No.: US 6,263,620 B1
(45) Date of Patent: Jul. 24, 2001

(54) SOUNDPROOF HANGAR FOR AIRPLANES

(75) Inventor: Thomas J. Meyer, Hamburg (DE)

(73) Assignee: G + H Montage GmbH, Ludwigshafen (DE)

( * ) Notice: Subject to any disclaimer, the term of this patent is extended or adjusted under 35 U.S.C. 154(b) by 0 days.

(21) Appl. No.: 09/242,197

(22) PCT Filed: Aug. 12, 1997

(86) PCT No.: PCT/EP97/04419

§ 371 Date: Jan. 3, 2000

§ 102(e) Date: Jan. 3, 2000

(87) PCT Pub. No.: WO98/06625

PCT Pub. Date: Feb. 19, 1998

(30) Foreign Application Priority Data

Aug. 13, 1996 (DE) .......................................... 296 14 036 U

(51) Int. Cl.⁷ .............................. E04B 1/346; E04B 7/16
(52) U.S. Cl. .............................. 52/64; 52/144; 52/573.1; 244/115
(58) Field of Search ................................ 52/64, 66, 71, 52/72, 86, 144, 573.1; 244/115

(56) References Cited

U.S. PATENT DOCUMENTS

| | | | |
|---|---|---|---|
| 3,234,695 | * | 2/1966 | Johnson ................................ 52/64 |
| 3,543,455 | * | 12/1970 | Walsh ................................... 52/64 |
| 3,739,537 | * | 6/1973 | Barnes .................................. 52/64 |
| 3,940,892 | * | 3/1976 | Lindbergh ............................. 52/86 |
| 4,004,382 | * | 1/1977 | Carlson ................................. 52/64 |
| 5,119,935 | * | 6/1992 | Stump et al. ..................... 52/64 X |
| 5,365,782 | * | 11/1994 | Bouis et al. ...................... 52/64 X |

FOREIGN PATENT DOCUMENTS

| | | |
|---|---|---|
| 1439385 | 8/1966 | (FR) . |
| 1444407 | 10/1966 | (FR) . |
| 1089630 | 11/1967 | (GB) . |

\* cited by examiner

*Primary Examiner*—Carl D. Friedman
*Assistant Examiner*—Yvonne M. Horton
(74) *Attorney, Agent, or Firm*—Alix, Yale & Ristas, LLP

(57) ABSTRACT

This invention concerns a sound proof hangar for airplanes with a wide entrance (3) for aircraft (7). To provide a sound barrier at the open side, the entrance opening is limited, at least on one side, by a series of deflecting surfaces (10), the inner edges of which are directed, in horizontal section, towards the hangar interior and the external edges of which are directed laterally. The deflecting surfaces (10) can be moved between a closed position which partly or completely closes the entrance opening (3) and a position which opens the entrance opening (3).

16 Claims, 2 Drawing Sheets

SOUNDPROOF HANGAR FOR AIRPLANES

BACKGROUND OF THE INVENTION

1. Field of the Invention

For the purpose of screening the noise of aircraft engines during the test run, use is made of soundproof hangars that accommodate more or less the entire aircraft. The hangar opening is frequently left completely open, the hangar being oriented such that it screens the emission to the residential side, whereas the opening is directed toward the noise-insensitive side. There are cases, however, in which it is also necessary to take sound-damping measures on the opening side. This means that the opening has to be capable of being closed completely or partially, or that the engines, as sound sources, have to have the walls of the hangar projecting laterally beyond them toward the opening side in order for the free acoustic emission angle to be small enough.

2. Description of the Related Art

In the case of a known soundproof hangar (GB-1089630) with a wide entrance opening for aircraft, the air inlets are arranged in the side walls of the hangar. They are subdivided by a multiplicity of ribs which are located perpendicularly with respect to the side wall and cause the inflowing air to flow transversely with respect to the longitudinal axis of the hangar or the longitudinal axis of the engines. This has considerable disadvantages for those engines which react sensitively to non-uniform incoming flow, for example those which are provided with a bypass. If, as a result of the air guidance contained in the wall, they are subjected to non-uniform incoming flow, they may be damaged and possibly even destroyed.

SUMMARY OF THE INVENTION

An object of the invention is thus to provide an opening-side acoustic barrier which can also be used for the test runs of engines which are sensitive to incoming flow. The solution according to, the invention comprises the features of claim 1 and preferably those of the subclaims.

Accordingly, in the direction or the directions in which sound screening is necessary, the hangar opening is bounded in each case by a series of curved deflecting surfaces as sound-damping bodies which enclose between them flow paths directed into the hangar interior and of which the inner border is directed into the hangar interior, in horizontal section. At least the majority of the acoustic waves which come into contact with the deflecting-surface group from the inside cannot penetrate to the outside without at least one reflection. This is usually enough for sufficient screening. At the same time, however, the deflecting surfaces permit a flow that enters into the hangar in the longitudinal direction, and thus parallel to the engine direction, and can reach the inlet openings of the engines without any great amount of vortex generation.

Although soundproof hangars (FR-A-1439385, FR-A-1444407) in which the air is admitted through the entrance doors, designed as sound-damping bodies, are known, there is nevertheless arranged within the entrance doors, designed as sound-damping means, a multiplicity of edges or points of inflection which result in the air deflected to the engines forming vortices, this adversely affecting engines which are sensitive to incoming flows. The deflecting bodies are not curved.

It may be expedient for the deflecting surfaces to be provided in a moveable manner in order for it to be possible, with the aid of said deflecting surfaces, to close or expose the hangar opening completely or partially. For example, the deflecting surfaces may be combined to form a unit, all parts of which can be moved together. For such a deflecting-surface block, it is possible to provide a common traveling gear mechanism and corresponding rails in the ground, these making it possible to move the block between the open position and closed position. However, there may also be cases in which the deflecting surfaces of the metal sheet can be moved individually in each case or can be pivoted individually or all together.

In most cases, it is sufficient for additional screening to be carried out in the manner according to the invention merely on the opening border. The deflecting surfaces or deflecting-surface groups then adjoin an opening border in each case. However, it is also possible for the entire opening to be closed in the manner according to the invention.

Finally, it is possible for all the deflecting surfaces, or all of the deflecting surfaces which are arranged in the vicinity of the wall edge, to be provided in a stationary manner, in which case they are arranged such that they do not constrict the full opening width.

BRIEF DESCRIPTION OF THE DRAWINGS

The invention is explained in more detail hereinbelow with reference to the drawing, which illustrates an advantageous exemplary embodiment, and in which.

DETAILED DESCRIPTION OF THE PREFERRED EMBODIMENT

Figure 1:
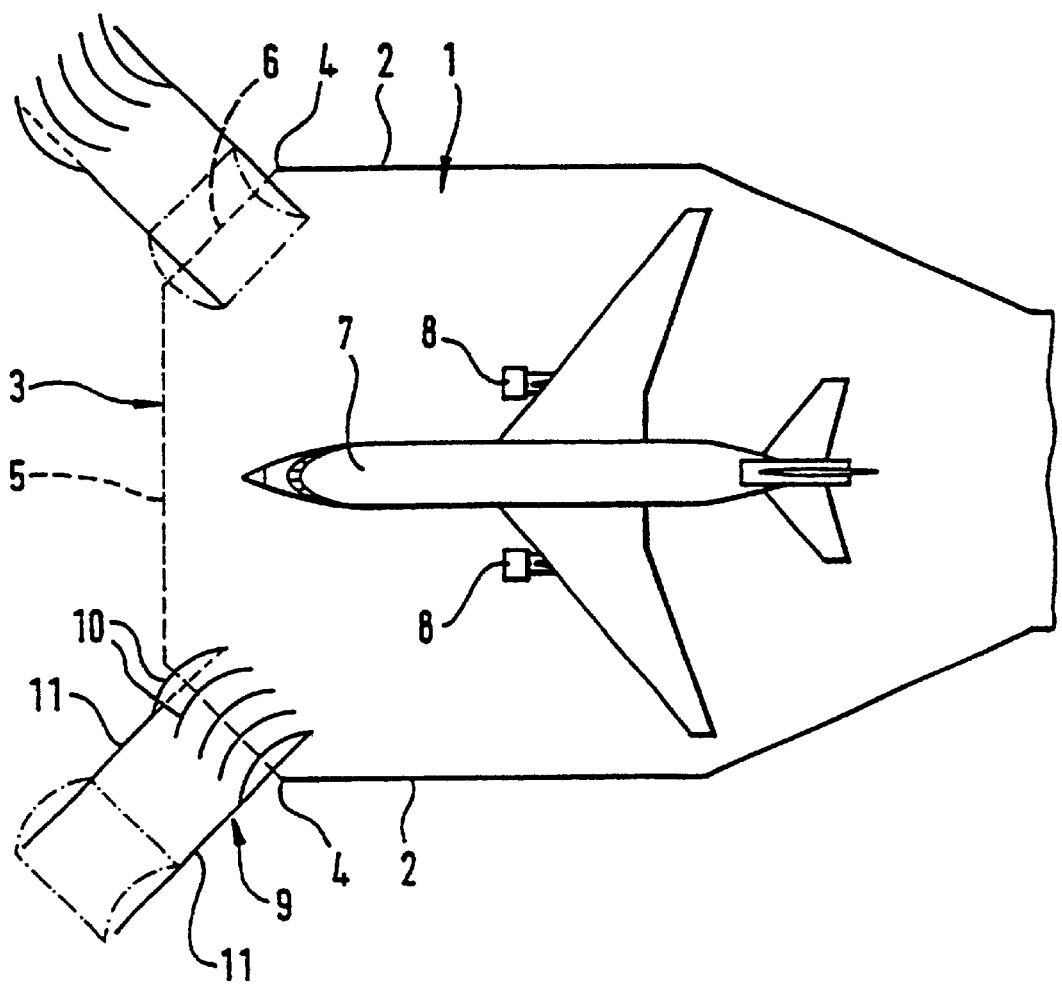
FIG. 1 shows a schematic overall plan view of a soundproof hangar.

The soundproof hangar 1 with side walls 2 has an opening 3 which is bounded by the borders 4 of the side walls 2, by the front edge 5, 6 of the roof and by the ground. This opening extends over the entire width of the hangar, in order to provide, for example, a modern commercial aircraft 7 with a sufficient entrance width. In the example illustrated, the open acoustic-emission angle of this opening, in relation to each individual engine 8, is more than 100°.

According to the invention, this opening angle is reduced in that in each case one block 9 of deflecting surfaces 10, which can be moved on rails 11 between a closed position and an open position, is provided in the border regions of the opening 3, adjoining the borders 4 of the side walls 2. In FIG. 1, solid lines are used to show this block in the open position at the top and in the closed position at the bottom, while chain-dotted lines are used to indicate the other extreme position in each case. In the open position, the spacing between the two screening blocks 9 is at least of the same size as the opening width of the hangar. In the closed position, each block adjoins the associated wall edge 4. Each deflecting surface preferably extends vertically between the roof border 6 and the ground.

Figure 2:
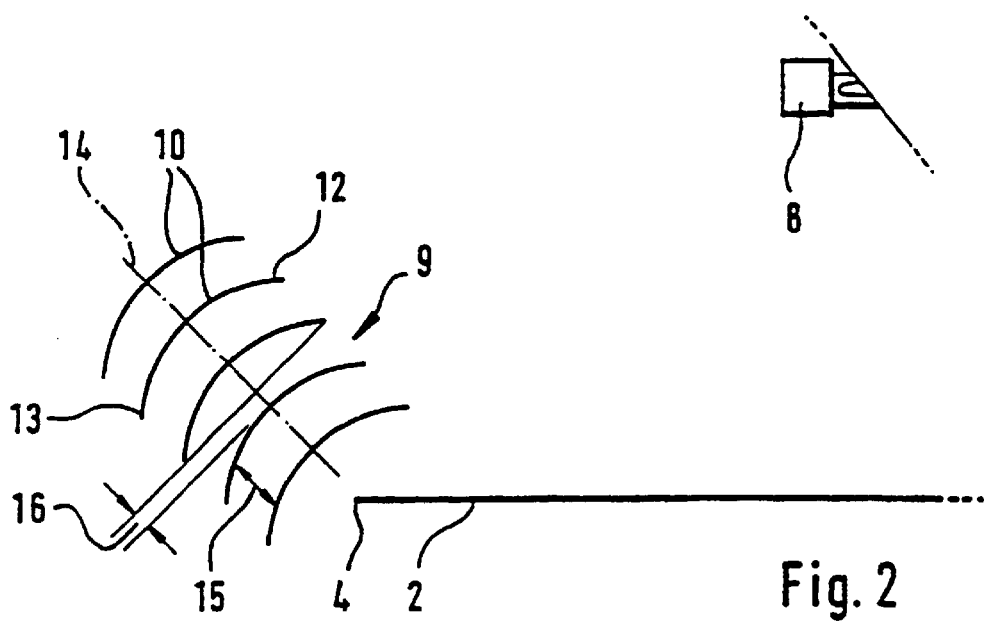
FIG. 2 shows a part on an enlarged scale.

The deflecting surfaces 10, in horizontal section, are preferably curved along an arc of a circle and arranged parallel to one another, their inner ends 12 running parallel to the longitudinal direction of the hangar or parallel to the direction of the side walls 2, while their outer borders 13 are directed, transversely with respect to the same, toward the side and away from the centre line of the hangar. Their centre line 14 runs at 45° with respect to the longitudinal direction of the hangar. Their spacing 15 is selected so as to produce the sound-screening effect which is necessary in each case. Ideally, it is not possible to see through between them in the direction perpendicular to their centre line 14; i.e. the spacing 16 between the line connecting their ends and the next adjacent deflecting surface is zero. However, this is not in any way always necessary. Even if the spacings are selected in the manner indicated in FIG. 2, it is possible to achieve a sufficient screening effect in relation to the position of an engine 8.

The deflecting surfaces 10 are expediently of sound-absorbing design. Furthermore, the deflecting-surface block is expediently closed in each case by one horizontal cover surface at its top and bottom ends. However, this may be dispensable at one end and/or the other if the struts (not shown in the drawing) connecting the individual deflecting surfaces to one another are likewise coated in a sound-absorbing manner, said struts being arranged, in grid form, with sufficiently narrow spacings from one another at the ends.

The distance between the bottom end of the deflecting-surface block and the ground, on the one hand, and between the top end of the deflecting-surface block and the roof border 6, on the other hand, which is necessary for the displaceability of the block, can be sealed in a suitable manner, for example by moveable and/or flexible shutters.

The deflecting-surface block is connected to the side-wall edge 4 so as to prevent an excessive amount of sound permeating between said wall edge and the next deflecting surface as a result of diffraction on the wall edge 4. On the one hand, the spacing is selected to be correspondingly small and, on the other hand, the wall edge 4 can be designed to be resistant to diffraction, e.g. to be itself curved similarly to the deflecting surfaces 10.

In the case of the dimensional relationships illustrated in the drawing, in relation to the engines 8, the screening blocks reduce the free region of the opening 3 by approximately half. Although the screening blocks are located in the suction region of the engines 8, they avoid the nonuniform incoming flow caused by separation vortices on sharp terrain edges and improve the situation in relation to the fully free state of the opening 3, because the sucked-in air leaves the screening blocks in the inward direction parallel to the longitudinal direction of the hangar. Optimization of the precise dimensions, of the curvature and of the angles which form the deflecting-surface ends in cross section in relation to the longitudinal direction of the hangar can easily be carried out using appropriate tests.

It is not necessary for the screening blocks to be provided symmetrically -on both sides of the opening 3. In many cases, it may suffice to provide just one screening block arranged on one side. The screening blocks may extend over a greater or lesser part of the opening width; it is also possible for them to close the latter completely. It is not necessary for the outer cross-sectional borders 13 of the deflecting surfaces to be aligned precisely to 90° in relation to the longitudinal direction of the hangar; rather, a smaller deflecting angle is sufficient in many cases. It is then also possible for the angle between the centre line 14 of the deflecting-surface block and the transverse direction of the hangar to be selected to be correspondingly smaller. This angle is expediently approximately half the deflecting angle of the deflecting surfaces 10.

Figure 3:
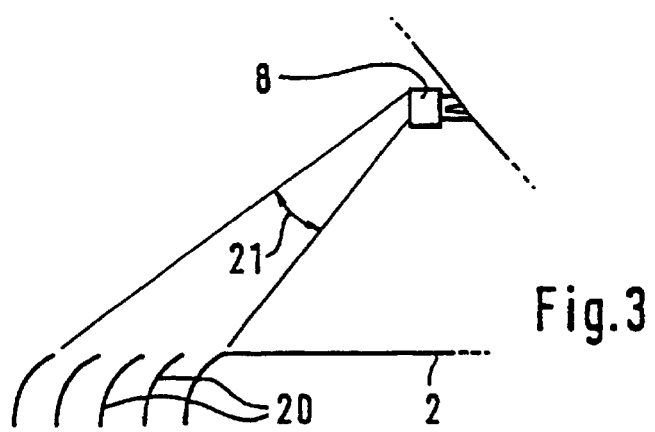
FIGS. 3 and 4 show partial illustrations of further exemplary embodiments.

The emission angle may also be reduced in that the side walls 2 of the hangar are lengthened on the opening side by a group of deflecting surfaces 20 according to FIG. 3. In this case, the deflecting surfaces may be arranged in the stationary manner because they do not reduce the opening width. Their inner edges are in alignment with the associated side wall 2.

With this arrangement it is not possible for the screening surfaces, in horizontal section, to be arranged parallel to the longitudinal direction of the hangar at their inner border. In many cases this is not necessary either. In the example illustrated, the screening surfaces are aligned approximately in the direction of that region within the hangar in which an engine 8, as sound source, may be assumed to be positioned. The reduction in the open sound-emission angle achieved by them amounts to the magnitude of the angle 21.

Figure 4:
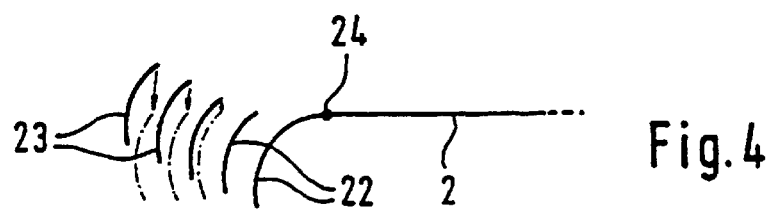

FIG. 4 shows an example in which the two deflecting surfaces 22 next to the side wall 2 are arranged in the stationary manner, their inner edges not projecting in the inward direction beyond the alignment line of the side wall 2. In contrast, the three following deflecting surfaces 23 can be pivoted individually, or as a block, about the end point 24 of the side wall 2, with the result that, on the one hand, they can assume a position which is illustrated by solid lines and in which they are drawn some way inward in order to reduce the sound-emission angle analogously to the example of FIG. 1. However, they may also be pivoted out of the opening width in the arrow direction and then assume the position which is indicated by chain-dotted lines and in which they release the full opening width of the hangar. Instead of being pivotable, it is also possible for them to be pushed together in the manner of a blind or to be removed from the open region in some other way.

If a soundproof hangar is to be erected in the vicinity of runway, where the permissible installation height is restricted, it may be the case that the installation height is not sufficient for accommodating high aircraft tail units. In this case, the soundproof hangar may be provided with a slit in the ridge region for the purpose of accommodating an aircraft tail unit. This can likewise be optimized in terms of flow and acoustics by the means according to the invention. For this purpose, the slit is provided with moveable flaps which—as has been described above—prevent or reduce the occurrence of separated vortices and the passage of sound.

What is claimed is:

1. A soundproof hangar for testing aircraft, said hangar comprising:
   a roof;
   a floor;
   two side walls;
   a wide entrance opening for aircraft, said entrance opening defined by the roof, the floor and the side walls; and
   an entrance closure at least partially comprised of at least one series of vertical sound deflecting bodies, each said sound deflecting body having an arcuate horizontal cross section, an outer arcuate portion extending outside the hangar and an inner arcuate portion extending inside the hangar;
   wherein said sound deflecting bodies are arranged so that said outer portions are directed substantially transversely to a longitudinal dimension of the hangar and said inner portions are directed substantially parallel to the longitudinal dimension of the hangar.

2. The soundproof hangar of claim 1, wherein said at least one series of vertical sound deflecting bodies is movable between a closed position in which said at least one series of vertical sound deflecting bodies forms part of said entrance closure and an open position in which said at least one series of vertical sound deflecting bodies do not obstruct said entrance opening.

3. The soundproof hangar of claim 1, wherein each said vertical sound deflecting body is rotatable about a central vertical axis.

4. The soundproof hangar of claim 3, wherein said vertical sound deflecting bodies are connected so that all said vertical sound deflecting bodies in said series rotate together.

5. The soundproof hangar of claim 1, wherein the vertical sound deflecting bodies comprising said at least one series are combined to form a unit, said unit movable with relation to said hangar and said vertical sound deflecting bodies movable with relation to said unit.

6. The soundproof hangar of claim 1, wherein at least some of said vertical sound deflecting bodies are arranged in fixed relationship to said hangar so that said fixed vertical sound deflecting bodies do not narrow said entrance opening.

7. The soundproof hangar of claim 1, wherein each said vertical sound deflecting body has a vertical axis and said at least one series of vertical sound deflecting bodies comprises a plurality of said vertical sound reflecting bodies substantially equidistantly spaced from each other and arranged with said vertical axes in a line approximately 45° from a longitudinal direction of the hangar.

8. The soundproof hangar of claim 1, wherein each said vertical sound deflecting body is of sound absorbing design.

9. A soundproof hangar with a wide, constantly open entrance opening for aircraft, said soundproof hangar comprising:

at least one series of sound deflecting bodies arranged as an extension of a side wall of the hangar, each said sound deflecting body having an inner portion extending into the hangar and an outer portion extending outside the hangar;

wherein said inner portions of said sound deflecting bodies are directed substantially parallel to a longitudinal direction of the hangar and the outer portions of said sound deflecting bodies are directed substantially transversely to the longitudinal direction of the hangar.

10. The soundproof hangar of claim 9, wherein said at least one series of sound deflecting bodies is movable between a closed position in which said at least one series of sound deflecting bodies narrows an acoustic emission angle of said entrance opening and an open position in which said at least one series of sound deflecting bodies does not reduce the size of said entrance opening.

11. The soundproof hangar of claim 9, wherein each said sound deflecting body is rotatable about a central vertical axis.

12. The soundproof hangar of claim 11, wherein said sound deflecting bodies are connected so that all said sound deflecting bodies in said series rotate together.

13. The soundproof hangar of claim 9, wherein the sound deflecting bodies comprising said at least one series are combined to form a unit, said unit movable with relation to said hangar.

14. The soundproof hangar of claim 9, wherein each said sound deflecting body has a vertical axis and said at least one series of sound deflecting bodies comprises a plurality of said sound reflecting bodies substantially equidistantly horizontally spaced from each other and with said vertical axes arranged along a line approximately 45° from a longitudinal direction of the hangar.

15. The soundproof hangar of claim 9, wherein at least some of said deflecting bodies are arranged in fixed relationship to said hangar so that said deflecting bodies do not narrow said wide entrance opening.

16. The soundproof hangar of claim 9, wherein said sound deflecting bodies are of sound absorbing design.

* * * * *